(12) United States Patent
Haba et al.

(10) Patent No.: US 7,290,818 B2
(45) Date of Patent: Nov. 6, 2007

(54) CONTROL PANEL ASSEMBLY FOR A VEHICLE

(75) Inventors: Charles A. Haba, Troy, MI (US); Jason Gamache, Romeo, MI (US)

(73) Assignee: Lear Corporation, Southfield, MI (US)

( * ) Notice: Subject to any disclaimer, the term of this patent is extended or adjusted under 35 U.S.C. 154(b) by 190 days.

(21) Appl. No.: 11/087,951

(22) Filed: Mar. 23, 2005

(65) Prior Publication Data

US 2006/0214451 A1 Sep. 28, 2006

(51) Int. Cl.
*B60N 3/12* (2006.01)

(52) U.S. Cl. .................. 296/37.12; 180/315

(58) Field of Classification Search ........... 296/37.7, 296/37.12, 37.8, 37.13, 37.15, 37.16, 70; 180/315, 333; 224/539, 282, 929
See application file for complete search history.

(56) References Cited

U.S. PATENT DOCUMENTS

| | | | |
|---|---|---|---|
| 2,091,059 A | 8/1937 | Tjaarda |
| 3,039,642 A | 6/1962 | Perkins |
| 3,061,394 A | 10/1962 | Whetstone |
| 4,087,126 A | 5/1978 | Wynn |
| RE33,112 E | 11/1989 | Durham |
| 5,102,181 A | 4/1992 | Pinkney |
| 5,259,655 A | 11/1993 | Anderson |
| 5,338,081 A | 8/1994 | Young et al. |
| 5,823,599 A | 10/1998 | Gray |
| 6,086,129 A | 7/2000 | Gray |
| 6,158,795 A | 12/2000 | Gray et al. |
| 6,176,534 B1 | 1/2001 | Duncan et al. |
| D449,026 S | 10/2001 | Norman et al. |
| 6,354,649 B1 | 3/2002 | Lee |
| D455,691 S | 4/2002 | Okonkwo |
| 6,394,526 B1 | 5/2002 | Gyllenspetz |
| 6,428,072 B1 | 8/2002 | Moore |
| 6,666,492 B1 | 12/2003 | Schmidt et al. |
| 2001/0011664 A1 | 8/2001 | Meritt |
| 2003/0001406 A1 | 1/2003 | Shibata |
| 2004/0142675 A1 | 7/2004 | Chen |

FOREIGN PATENT DOCUMENTS

| | | |
|---|---|---|
| DE | 34 08 728 A1 | 9/1985 |
| DE | 197 25 175 A1 | 12/1998 |
| DE | 199 23 707 A1 | 11/2000 |
| EP | 1 288 058 A2 | 5/2003 |
| IT | 1215821 B | 2/1990 |
| JP | 355008975 | 1/1980 |
| JP | 406219220 | 8/1984 |
| JP | 5-105002 A | 4/1993 |

(Continued)

*Primary Examiner*—Joseph D. Pape
(74) *Attorney, Agent, or Firm*—MacMillan, Sobanski & Todd, LLC

(57) ABSTRACT

A control panel assembly for a vehicle includes a moveable panel having a primary face and an edge face. The moveable panel movable between a first position and a second position. A first control device is mounted on the primary face of the moveable panel. The first control device is generally exposed when the moveable panel is in the first position. A second control device is mounted on the edge face of the moveable panel. The second control device is generally exposed when the moveable panel is in the second position.

18 Claims, 4 Drawing Sheets

| | FOREIGN PATENT DOCUMENTS | | JP | 409267662 | 10/1997 |
|---|---|---|---|---|---|
| JP | 406087387 | 3/1994 | JP | 410006836 | 1/1998 |
| JP | 8-058480 A | 3/1996 | WO | WO 92/19065 A1 | 10/1992 |

CONTROL PANEL ASSEMBLY FOR A VEHICLE

BACKGROUND OF THE INVENTION

This invention relates in general to control panel assemblies for vehicles.

Consumers of vehicles, particularly automotive vehicles, desire an increasing amount of storage within the vehicle interior. In response, vehicle interiors are being provided with an increasing amount of storage compartments. One example of such a compartment is the hidden storage compartment. The hidden storage compartment typically includes a cavity formed within the vehicle interior and is selectively covered by a moveable panel.

Consumers of vehicles, particularly automotive vehicles, also desire an increasing amount of control devices within the vehicle interior. For example, in addition to typical control devices, such as HVAC control devices and broadcast radio control devices, consumers desire control devices for more recently available vehicle systems, such as satellite radio control devices, GPS control devices and additional control devices for a variety of other systems. Typically, these control devices are mounted on a control panel and the control panel is mounted in the vehicle interior. These control panels and the storage compartments generally compete for space within the vehicle and typically a decision must be made to include one at the expense of the other.

It would therefore be advantageous to develop an improved control panel assembly that would maintain the functionality of device control while allowing for increased storage within a vehicle.

BRIEF SUMMARY OF THE INVENTION

This invention relates in general to control panels for vehicles and more specifically to a control panel assembly for a vehicle including a moveable panel having a primary face and an edge face.

In a preferred embodiment, the moveable panel is movable between a first position and a second position. A first control device is mounted on the primary face of the moveable panel. The first control device is generally exposed when the moveable panel is in the first position. A second control device is mounted on the edge face of the moveable panel. The second control device is generally exposed when the moveable panel is in the second position.

Various objects and advantages of this invention will become apparent to those skilled in the art from the following detailed description of the preferred embodiment, when read in light of the accompanying drawings.

DETAILED DESCRIPTION OF THE INVENTION

Figure 1:
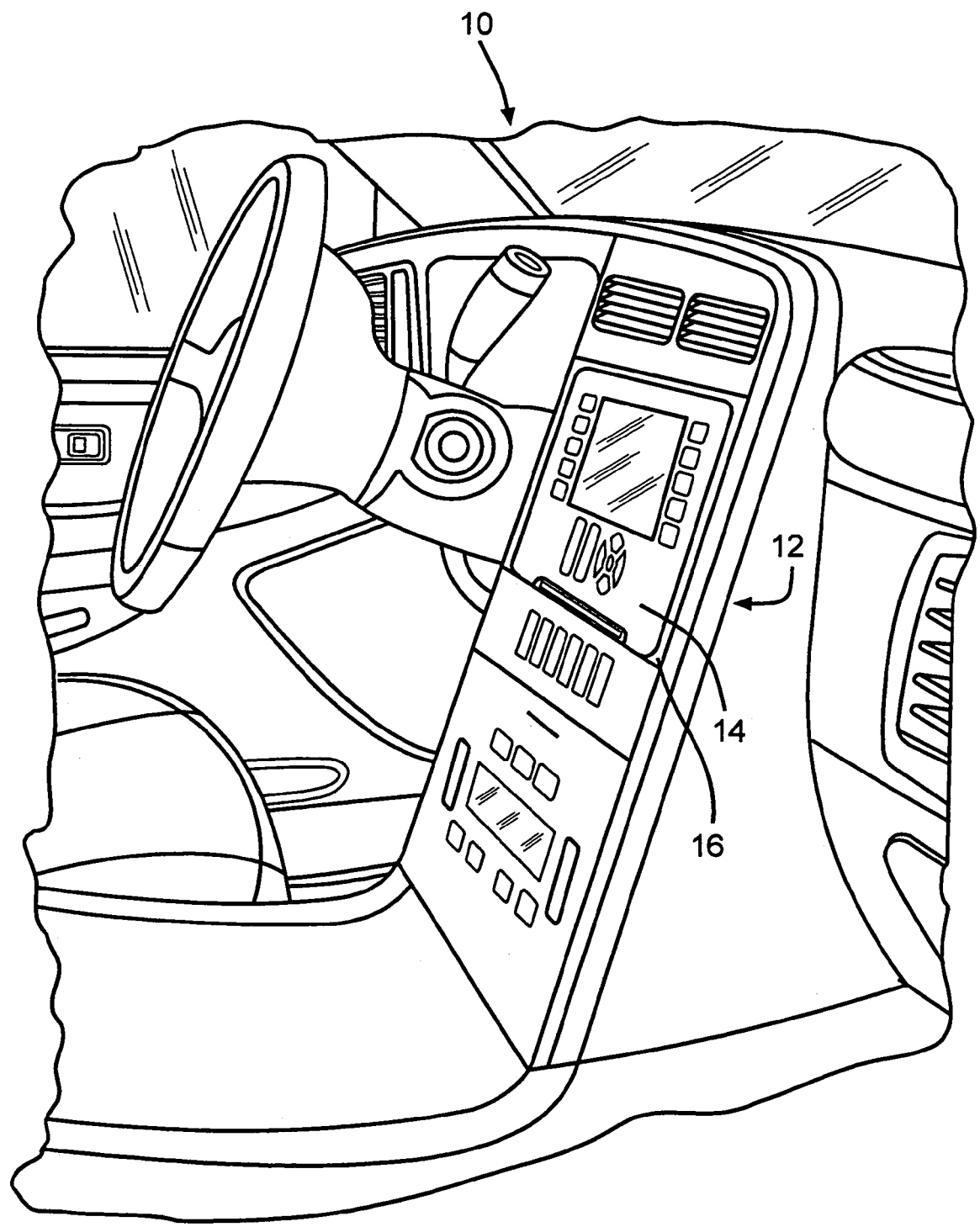
FIG. 1 is a perspective view of a vehicle interior including a control panel assembly in accordance with the present invention.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring now to the drawings, there is illustrated in FIG. 1 a portion of an interior of a vehicle, indicated generally at 10, including a control panel assembly in accordance with the present invention, indicated generally at 12. The control panel assembly 12 includes a moveable panel 14 movably attached to a housing 16 in the vehicle 10.

Figure 2:
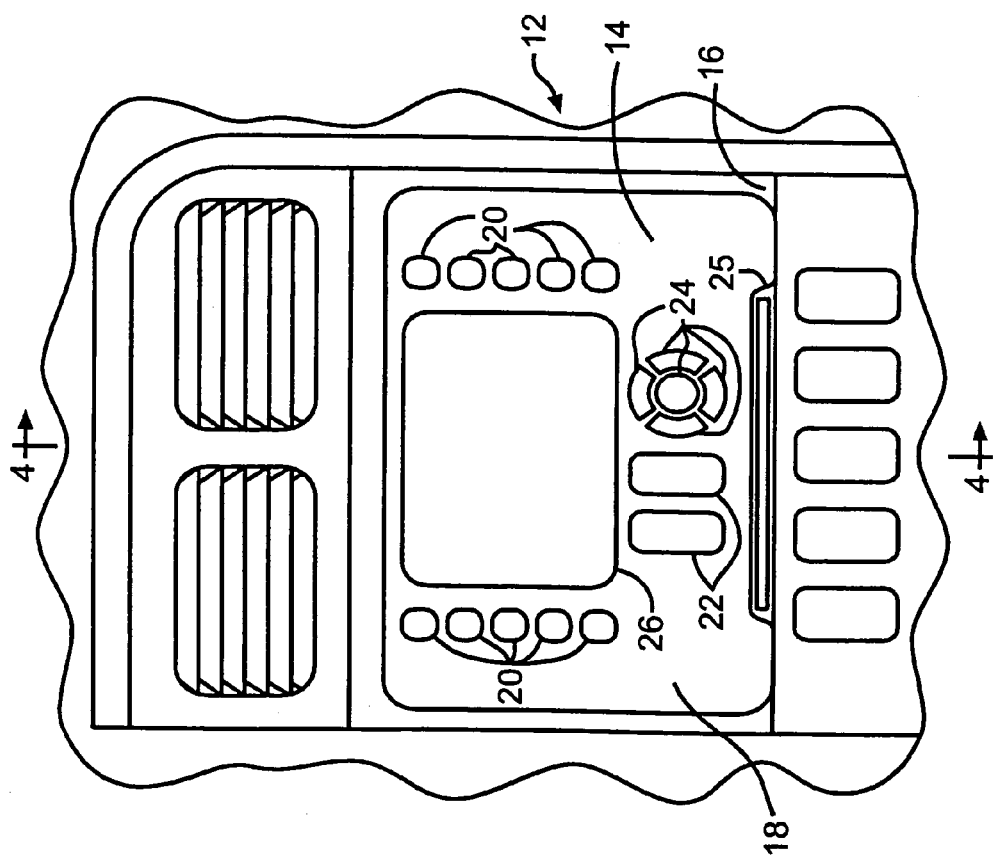
FIG. 2 is a front perspective view of the control panel assembly of FIG. 1, shown with the moveable panel in a first position.
Figure 4:
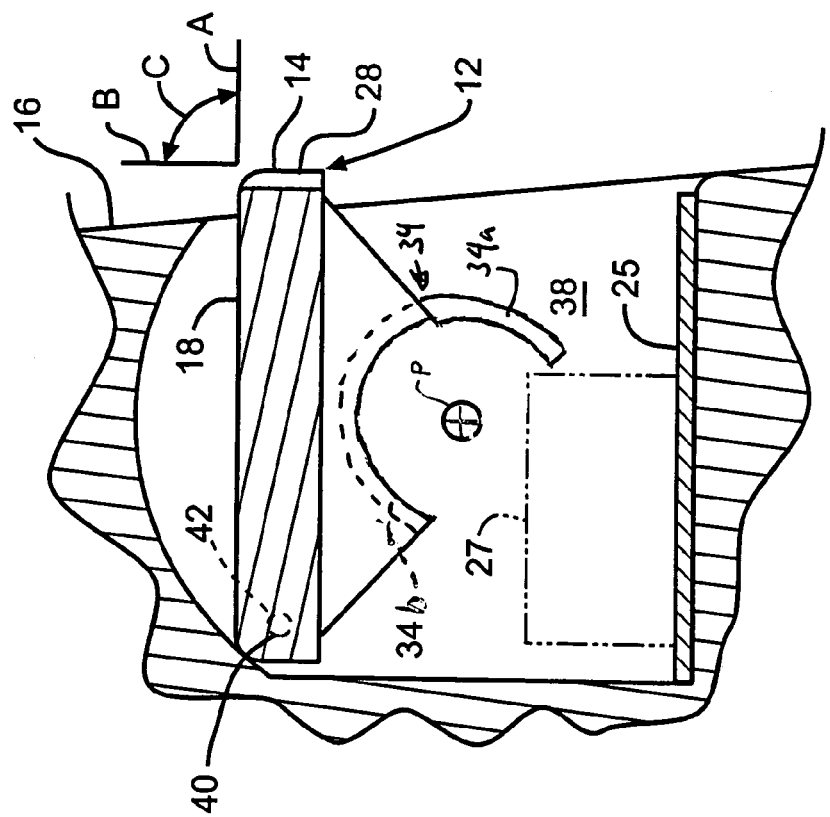
FIG. 4 is a partial cross-sectional side view of the panel assembly of FIG. 2, taken along line 4-4.

The moveable panel 14 is illustrated in FIGS. 2 and 4 in a first, e.g., closed, position relative to the housing 16. The moveable panel 14 has a primary, e.g., front, face 18. The primary face 18 preferably includes a plurality of control devices in the form of thin touch sensors 20, thin dual rocker switches 22 and thin actuation buttons 24 mounted thereon. It must be understood, however, that the control devices may be any suitable sensors, switches, actuators, interactive display devices or any other suitable devices. As shown in FIG. 2, the control devices 20, 22, and 24 are accessible from the interior of the vehicle 10 when the movable panel 14 is in the first position. Preferably the control devices 20, 22, and 24 are suitable to control a variety of vehicle systems, such as audio/video (radio, CD, DVD, etc.) systems, climate control systems, Global Positioning Systems and any other suitable vehicle system. For example, in the case of an audio/video system the touch sensors 20 may control device presets, such as programmed radio station frequency assignments, the dual rocker switch may control volume or scanning, such as radio station frequency searching, and the actuation buttons 24 may control device selection, such as a radio component (not shown), a CD component (not shown), a DVD component 25, an optional wireless component (such as a Bluetooth enabled MP3 player) 27, and any other suitable wired or wireless device.

The primary face 18 further includes an optional electrical component in the form of a display screen 26. The display screen 26 may by an LED panel, LCD, or any other suitable display. For example, the display screen 26 may function to display the output of the DVD component 25, may function as a user interface to display setup and/or function information for the audio/video system, or may function in any other suitable manner.

Figure 3:
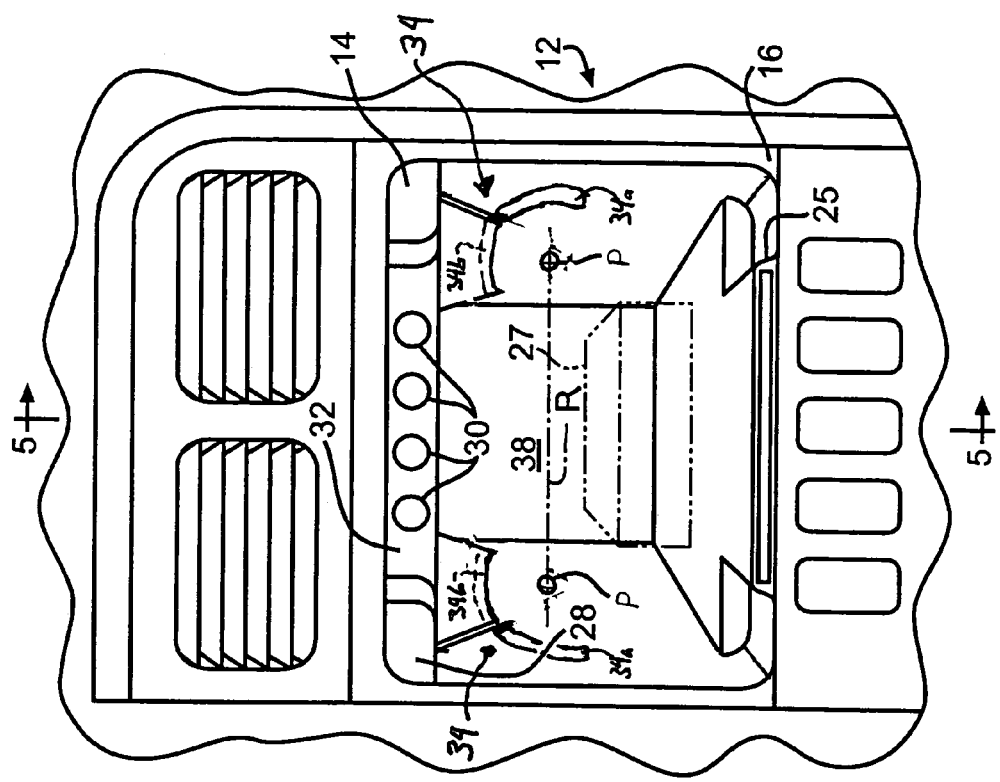
FIG. 3 is a front perspective view of the control panel assembly of FIG. 1, shown with the moveable panel in a second position.
Figure 5:
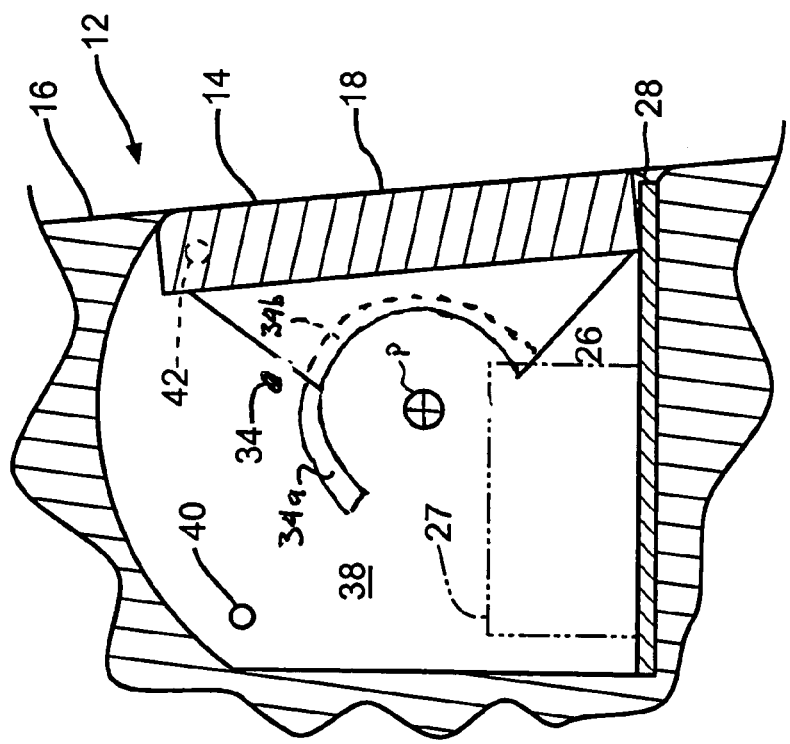
FIG. 5 is a partial cross-sectional side view of the panel assembly of FIG. 3, taken along line 5-5.

The moveable panel 14 is illustrated in FIGS. 3 and 5 in a second, e.g., open, position relative to the housing 16. The moveable panel 14 has a secondary, e.g., edge, face 28. As best seen in FIG. 5, preferably the primary face 18 defines a first plane A and the edge face 28 defines a second plane B such that the first plane A and the second plane B intersect at any desired angle. Most preferably, the first and second planes A and B intersect at an angle of approximately 90 degrees, as indicated at C in FIG. 5.

The edge face 28 includes a plurality of control devices in the form of touch sensors 30 mounted thereon. The touch sensors 30 are accessible from the interior of the vehicle 10 when the movable panel 14 is in the second position, as shown in FIGS. 3 and 5. Preferably the touch sensors 30 are electronic control devices, such as touch switches or field effect transistors. However, it must be understood that the control devices included on the edge face 28 may be any suitable electronic control devices, mechanical control devices, or any other suitable control devices. For example, in an alternative embodiment the edge face 28 includes a capacitive field switch, (not shown).

As best seen in FIG. 3, the touch sensors 30 are preferably recessed within the edge face 28 as indicated at 32. Thus, when the moveable panel 14 is moving from the second position to the first position the touch sensors 30 do not interfere with the travel of moveable panel 14 and the bottom edge of the panel 14 can be generally flush with the housing 16. For example, because the touch sensors 30 are recessed, the touch sensors 30 do not contact the DVD component 25.

The touch sensors 30 on the edge face 28 are preferably redundant control devices to at least one of the plurality of touch sensors 20, dual rocker switches 22 and actuation buttons 24 that are mounted on the primary face 18. That is to say that the touch sensors 30 on the edge face 28 duplicate the function of at least one of the plurality of touch sensors 20, dual rocker switches 22 and actuation buttons 24 that are mounted on the primary face 18. For example, the touch sensors 30 on the edge face 28 may control volume and scanning to duplicate the function of the dual rocker switches 22 in the present case of controlling the audio/video system. Thus making the duplicated control function accessible regardless of the position of the panel 14.

As best shown in FIGS. 3-5, the moveable panel 14 is preferably pivotally mounted on the housing 16 by a track-rail system 34 for movement between the first and second positions. Preferably, the track-rail system 34 includes a pair of tracks 34a formed in the sidewalls of the housing 16 and a pair of corresponding rails 34b attached to opposite sides of the panel 14. Preferably, the rails 34b are arcuate in shape and generally parallel to each other and each pivot about a point P. In the preferred embodiment, the pivot points P define an axis of rotation R about which the moveable panel 14 rotates from the first position to the second position. It must be understood, however, that the moveable panel 14 may be moveable mounted to the housing 16 in any suitable manner, such as in a hinge bracket arrangement, in a conventional hinge arrangement, in a sliding engagement, or in any other suitable manner. The moveable panel 14 is movable between the first position, as shown in FIGS. 2 and 4, and the second position, as shown in FIGS. 3 and 5, such that plurality of touch sensors 20, dual rocker switches 22 and actuation buttons 24 are generally exposed, i.e. made accessible, when the moveable panel 14 is in the first position and the touch sensors 30 are generally exposed when the moveable panel 14 is in the second position. Further, in the preferred embodiment, the plurality of touch sensors 20, dual rocker switches 22 and actuation buttons 24 on the primary face 14 are generally concealed, i.e. made inaccessible, when the moveable panel 14 is in the second position and the touch sensors 30 on the edge face 28 are generally concealed when the moveable panel 14 is in the first position.

As shown in FIGS. 3-5, the housing 16 preferably has a cavity 38, i.e., hollow, formed therein, such that the moveable panel 14 generally covers a portion of the cavity 38 when in the first position, and the moveable panel 14 generally exposes the cavity 38 when in said second position. The cavity 38 may function as a storage compartment for storing various loose items. In the preferred embodiment, the control panel assembly 12 includes at least one electrical component disposed in the cavity, for example the wireless device 27, which may be an MP3 player, a blue tooth device, a mobile phone, or any other suitable wireless device. It must be understood, however, that the cavity 38 need not include any components such as the DVD component 25 or the wireless device 27. Indeed the cavity 38 may be filled components or devices of the manufacturer's or aftermarket installer's choosing, the cavity 38 may be entirely empty of components or devices, or partially or totally filled with components, devices, or other articles of the vehicle owner's or occupant's choosing.

Preferably the edge face 28 of the moveable panel 14 has a substantially smaller surface area than the primary face 18 such that when the panel 14 is moved from the first position to the second position the cavity 38 is substantially less concealed. In the preferred embodiment, the panel 14 is relatively flat for covering a generally large opening of the cavity 38, but occupying a minimal amount of space in the cavity 38 when the panel 14 is in the second position.

The control panel assembly 12 further preferably includes a position locking mechanism for retaining the moveable panel 14 in one of the first and second positions. The position locking mechanism is most preferably a detent arrangement including a first detent member 40 on the housing 16 suitable for cooperating with a second detent member 42 on the moveable panel 14 for retaining the movable panel 14 in the second position. It must be understood that the panel 14 may be manually moveable or moveable by a motorized mechanism, (not shown).

For the purposes of this description "detent" shall include, but not be limited to, any device, such as a catch, dog, or spring-operated ball, for positioning and holding one mechanical part in relation to another so that the device can be released by force applied to one of the parts.

Thus the present invention allows for system control devices on multiple faces, i.e., planes, of a moveable panel. As described above, in the preferred embodiment the control devices include at least one touch switch including a field effect transistor. Most preferably, the touch switch duplicates the function control of one of the control devices on one of the faces other than the face that the touch switch is on. Preferably, the control devices are suitable to control one of an audio/video system, an HVAC system, a GPS system, or any other suitable vehicular system.

The present invention further preferably includes the moveable panel in a control panel assembly by moveably mounting the moveable panel in a housing including a cavity. Preferably, the moveable panel and the cavity cooperate to provide a hidden storage compartment with a cover panel having a plurality control devices where at least one device is accessible when the panel is in either a position to expose or conceal the cavity. Thus one aspect of the present invention provides for hidden storage compartment while maintaining the control functionality of the cover panel.

In one preferred embodiment, the at least one device includes a touch switch including a field effect transistor. The touch switch is located on a face of the moveable panel having less surface area than another face of the moveable panel having a control device that is redundant to the touch switch.

For the purpose of this description it must be understood that the term "touch switch" is intended to include, but not be limited to, any switch that is turned on and off by touching a contact, as opposed to, for example, moving a lever as in a conventional toggle switch.

Figure 6:
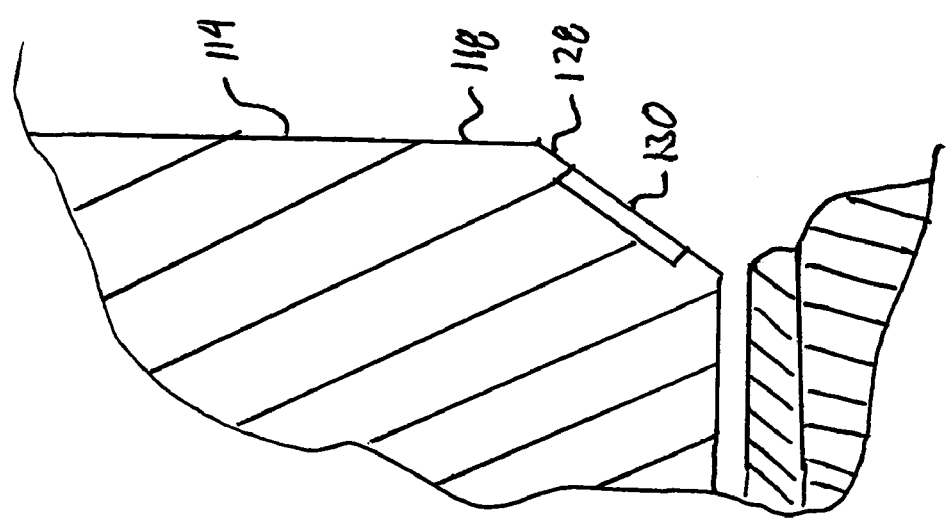
FIG. 6 is a partial cross-sectional side view of a portion of a panel in accordance with a first alternative embodiment of the present invention.

Shown in FIG. 6 is a portion of a panel 114 having a primary face 114 and an edge face 128. The panel 114 includes a control device 130 mounted on the edge face 128. The edge face 128 intersects the primary face 118 such that the control device 130 is accessible, i.e. generally exposed, when the panel 114 is in the first or second positions.

Figure 7:
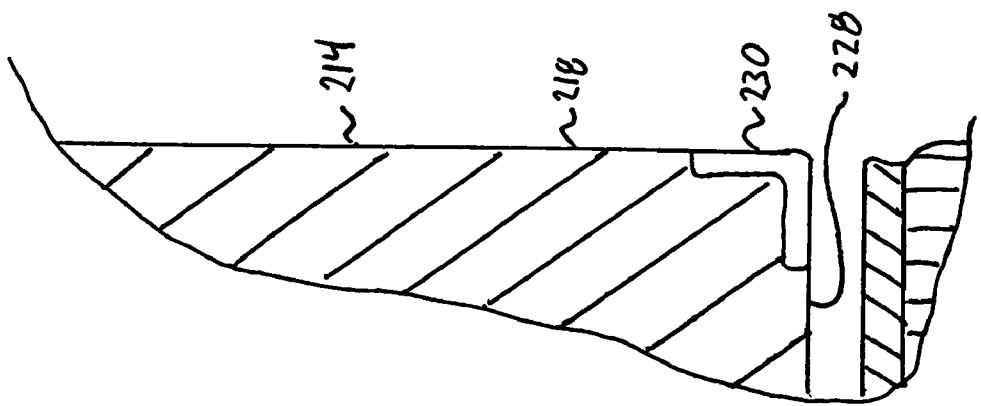
FIG. 7 is a partial cross-sectional side view of a portion of a panel in accordance with a second alternative embodiment of the present invention.

Shown in FIG. 7 is a portion of a panel 214 having a primary face 218 and an edge face 228. The panel 214 includes a control device 230 mounted on both the edge face 228 and the primary face 218 such that the control device 130 is accessible, i.e. generally exposed, when the panel 214 is in the first or second position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A control panel assembly for a vehicle comprising:
a moveable panel having a primary face and an edge face, said moveable panel moveable between a first position and a second position;
a first control device mounted on said primary face of said moveable panel, said first control device being generally exposed when said moveable panel is in said first position, wherein said first control device is concealed when said moveable panel is in said second position; and
a second control device mounted on said edge face of said moveable panel, said second control device being generally exposed when said moveable panel is in said second position, and said second control device is redundant to said first control device.

2. The control panel assembly of claim 1, wherein said edge face has a substantially smaller surface area than said primary face.

3. The control panel assembly of claim 1, wherein said second control device is recessed within said edge face.

4. The control panel assembly of claim 1, wherein said primary face defines a first plane, and wherein said edge face defines a second plane, wherein said first plane and said second plane intersect at an angle of approximately 90 degrees.

5. The control panel assembly of claim 1 wherein said second control device includes a touch switch.

6. The control panel assembly of claim 1 wherein said second control device includes a field effect transistor.

7. The control panel assembly of claim 1 further comprising a housing having a cavity formed therein, wherein said moveable panel is moveably mounted on said housing for movement between said first position and said second position, wherein said panel generally covers a portion of said cavity when in said first position, and wherein said panel generally exposes said cavity when in said second position.

8. The control panel assembly of claim 7 further comprising a position locking mechanism for retaining said moveable panel in one of said first and second positions.

9. The control panel assembly of claim 8, wherein the position locking mechanism includes a detent arrangement, said detent arrangement including a first detent member on said housing suitable for cooperating with a second detent member on said moveable panel.

10. The control panel assembly of claim 9 further comprising at least one electrical component disposed in said cavity.

11. The control panel assembly of claim 1 wherein a portion of said second control device is concealed when said moveable panel is in said first position.

12. The control panel assembly of claim 1, wherein said panel is rotatably moveable about an axis.

13. The control panel assembly of claim 11, wherein the entire second control device is generally concealed when said moveable panel is in said first position.

14. A control panel assembly for a vehicle comprising:
a moveable panel having a primary face and an edge face having a substantially smaller surface area than said primary face, said moveable panel moveable between a first position and a second position;
a first control device mounted on said primary face of said moveable panel, said first control device being generally exposed when said moveable panel is in said first position; and
a second control device mounted on said edge face of said moveable panel, said second control device being generally exposed when said moveable panel is in said second position, said second control device being redundant to said first control device.

15. The control panel assembly of claim 14 wherein said second control device includes a touch switch.

16. The control panel assembly of claim 14 further comprising a housing having a cavity formed therein, wherein said moveable panel is moveably mounted on said housing for movement between said first position and said second position wherein said panel generally covers a portion of said cavity when in said first position, and wherein said panel generally exposes said cavity when in said second position.

17. A control panel assembly for a vehicle comprising:
a moveable panel having a primary face and an edge face, said moveable panel moveable between a first position and a second position;
a first control device mounted on said primary face of said moveable panel, said first control device being generally exposed when said moveable panel is in said first position, wherein said first control device is concealed when said moveable panel is in said second position;
a second control device mounted on said edge face of said moveable panel, said second control device being generally exposed when said moveable panel is in said second position; and
a housing having a cavity formed therein, wherein said moveable panel is moveably mounted on said housing for movement between said first position and said second position; said panel generally covers a portion of said cavity when in said first position; said panel generally exposes said cavity when in said second position; and said cavity defines an opening and a storage compartment, wherein said panel is disposed in said opening covering said storage compartment when said panel is in said first position, and wherein said panel is disposed in an upper portion of said storage compartment exposing said opening when said panel is in said second position.

18. A control panel assembly for a vehicle comprising:

a housing having a cavity defining an opening and a storage compartment;

a panel moveably mounted on said housing for movement between a first position and a second position, said panel having a primary face and an edge face, wherein said panel is disposed in said opening covering said storage compartment when said panel is in said first position, and wherein said panel is disposed in an upper portion of said storage compartment exposing said opening when said panel is in said second position;

a first control device mounted on said primary face of said moveable panel, said first control device being generally exposed when said moveable panel is in said first position; and a second control device mounted on said edge face of said moveable panel, said second control device being generally exposed when said moveable panel is in said second position.

* * * * *